United States Patent [19]

Jönsson

[11] Patent Number: 5,685,463
[45] Date of Patent: Nov. 11, 1997

[54] COMBINED DROP AND SPRAY NOZZLE

[76] Inventor: Lars-Erik Jönsson, Passvägen 37, 4 tr., S-147 53 Tumba, Sweden

[21] Appl. No.: 507,342
[22] PCT Filed: Feb. 11, 1995
[86] PCT No.: PCT/SE94/00113
  § 371 Date: Aug. 15, 1995
  § 102(e) Date: Aug. 15, 1995
[87] PCT Pub. No.: WO94/18094
  PCT Pub. Date: Aug. 18, 1994
[51] Int. Cl.⁶ .................................................. G01F 11/06
[52] U.S. Cl. ..................... 222/291; 222/307; 222/402.2; 239/350
[58] Field of Search ................................. 222/287, 291, 222/307, 308, 355, 402.2, 402.22, 402.23; 239/344, 350

[56] References Cited

U.S. PATENT DOCUMENTS

| 2,892,576 | 6/1959 | Ward | 222/402.2 |
| 2,989,217 | 6/1961 | Focht | 222/402.2 |
| 3,221,946 | 12/1965 | Riley | 239/350 X |
| 3,231,150 | 1/1966 | Holm et al. | 222/355 |
| 3,250,444 | 5/1966 | Ward | 222/402.2 |
| 3,269,615 | 8/1966 | Ferry | 222/394 |
| 4,220,258 | 9/1980 | Gruenewald | 222/402.2 X |
| 5,085,351 | 2/1992 | Martin | 222/287 |
| 5,183,187 | 2/1993 | Martin et al. | 222/287 |

*Primary Examiner*—Joseph Kaufman
*Attorney, Agent, or Firm*—Frishauf, Holtz, Goodman, Langer & Chick

[57] ABSTRACT

A combined drop and spray nozzle device for use with a pressurized container for dispensing a product contained therein as an aerosol. The device includes an axially movable delivery outlet protruding from a top portion of the pressurized container, and a removable nozzle mounted on the delivery outlet for moving the delivery outlet between a closed position wherein the product is contained in the pressurized container and an open position wherein the product is discharged through the nozzle as an aerosol. A valve mechanism is axially movable in the nozzle with respect to the delivery outlet to open and close a predetermined portion of the delivery outlet, and a push-button is provided on the nozzle and is coupled to the valve mechanism for moving the valve mechanism to close the predetermined portion of the delivery outlet when the push-button is depressed and open the predetermined portion of the delivery outlet when the push-button is not depressed. The nozzle is operable independent of the push-button to discharge a continuous spray of aerosol, and the nozzle is operable together with the push button to deliver a discrete dose of aerosol.

11 Claims, 1 Drawing Sheet

COMBINED DROP AND SPRAY NOZZLE

BACKGROUND OF THE INVENTION

The present invention relates to a nozzle for use with pressurized containers, or dispensers, having a combined facility for the dosing and spraying of gas or liquid in aerosol form.

Products contained in pressurized containers are difficult to dose in small amounts and are hence difficult to direct or position with any degree of accuracy in, for example, the lubrication of precision-made mechanical components. Devices intended solely for discharge of a product from the container in the form of discrete doses are already known. The purpose of the present invention is to combine this function with a function permitting both stepless adjustment of the product flow and discharge of the product in the form of an aerosol spray.

BRIEF DESCRIPTION OF THE DRAWINGS

Embodiments of the invention are shown schematically in the drawings appended hereto, in which:

FIG. 6b is a top view of the embodiment shown in FIG. 6a.

DETAILED DESCRIPTION

Figure 4:
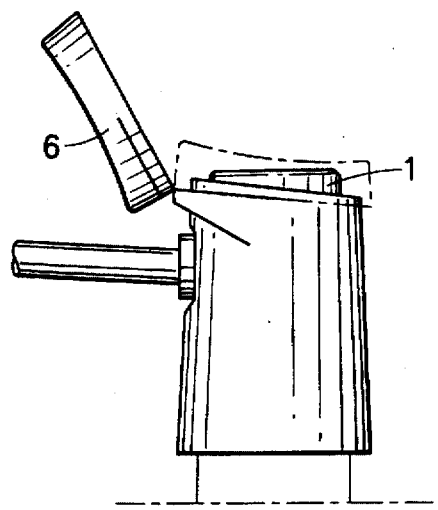
FIG. 4 shows a version of the invention having a closable cap.
Figure 5A:
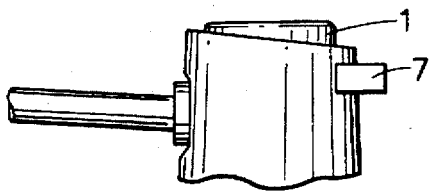
FIG. 5a shows a version of the invention having an adjustable stop.
Figure 5B:
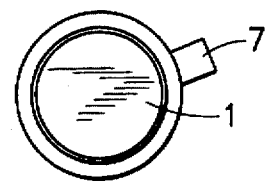
FIG. 5b is a top view of the embodiment shown in FIG. 5a, with the adjustable stop 7 in a different position.
Figure 6A:
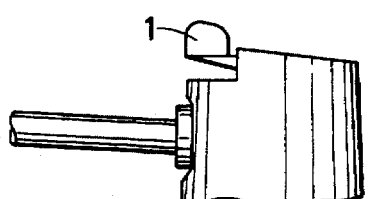
FIG. 6a shows a version of the invention having the push-button in an alternative peripheral position.
Figure 6B:
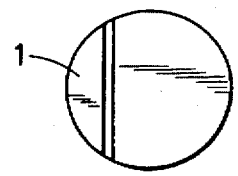

The invention, which interacts with the discharge valve and delivery outlet 3 of the pressurized container, enables a gas or aerosol to be discharged in doses of the desired amount either by throttling the flow of liquid or by the use of an intermediary chamber, which may be either fixed or adjustable in volume. Such functions are achieved by providing the nozzle 10 with a push-button 1 which may be operated as desired and which, when pushed, activates a valve cone (mechanism) 2 seated in or by the opening of the delivery outlet 3, which is itself adjustable such that the opening may be adjusted to any setting between completely open and completely closed. The push-button may be pre-set by means of an adjustable stop 7 (FIGS. 5a and 5b) or may be protected against unintentional pressure either by its position (FIGS. 6a and 6b) or by shielding it under a closable cap (FIG. 4, 6).

Figure 1:
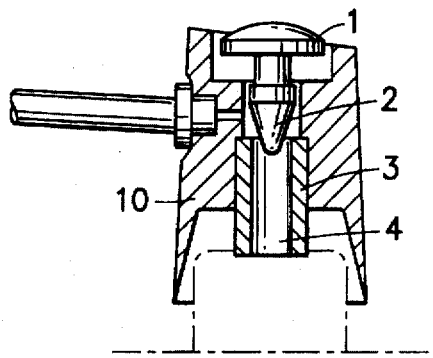
FIG. 1 shows the basic design of the invention, which may be modified as shown in FIGS. 4 to 6b.
Figure 2:
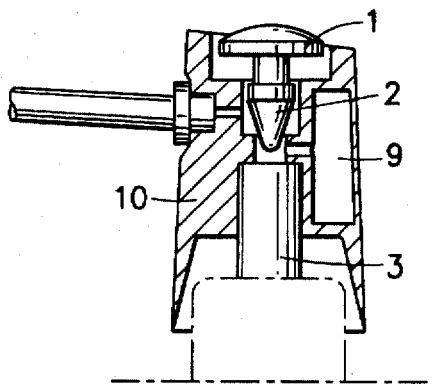
FIG. 2 shows a version of the invention having an enlarged intermediary chamber.
Figure 3:
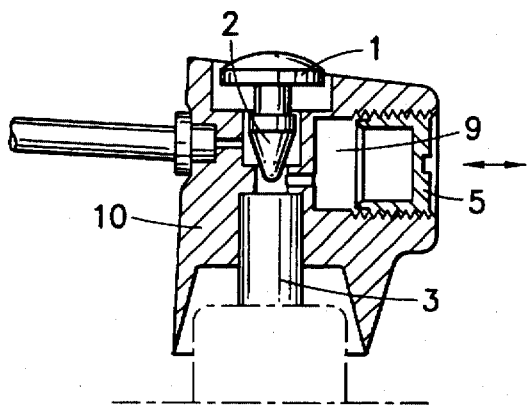
FIG. 3 shows a version of the invention having an enlarged, adjustable intermediary chamber.

For delivery of the product in discrete doses, the nozzle uses the delivery outlet 3 as an intermediary chamber 4; the capacity of the delivery outlet 3 is about one drop of liquid plus propellant (FIG. 1). Variants of the invention may comprise a capacity 9 of enlarged volume, which may be fixed in size (FIG. 2) or be adjustable by means of a set screw 5 or similar device (FIG. 3), which cavity 9 is located in a cavity or hollow section of the nozzle 10 and communicates with the opening of the delivery outlet 3 and the valve mechanism 2 activated by the push-button. Containers without a delivery outlet 3 may be fitted with an adapter.

For stepless adjustment of a continuous or intermittent flow of product, pressure is applied to the push-button 1 such as to produce the desired degree of throttling, at the same time that pressure is applied to the nozzle 10, bringing the delivery outlet 3 into an inserted position and opening the valve of the container. For spraying, no pressure is applied to the push-button 1 and the product is given free passage. For discharge of the product in discrete doses, pressure is applied to the push-button 1 such as to close the opening fully, and at the same time as pressure is applied to the nozzle 10, bringing the delivery outlet 3 into an inserted position and opening the valve of the container and filling the intermediary chamber 4 under pressure. The product contained in the intermediary chamber 4 is released and flows out of the nozzle 10 as the pressure on the push-button 1 is released and after the valve of the container has closed. The product contained in the intermediary chamber 4 can be discharged in discrete doses if pressure is applied to the push-button 1 once again.

I claim:

1. A combined drop and spray nozzle device for use with a pressurized container for dispensing a product contained therein as an aerosol, said device comprising:

an axially movable delivery outlet protruding from a top portion of the pressurized container;

a removable nozzle mounted on the delivery outlet for moving the delivery outlet between a closed position wherein the product is contained in the pressurized container and an open position wherein the product is discharged through the nozzle as an aerosol;

a valve mechanism axially movable in the nozzle with respect to the delivery outlet to open and close a predetermined portion of the delivery outlet; and a push-button provided on the nozzle and being coupled to the valve mechanism for moving the valve mechanism to close the predetermined portion of the delivery outlet when the push-button is depressed and open the predetermined portion of the delivery outlet when the push-button is not depressed, wherein the nozzle is operable independent of the push-button to discharge a continuous spray of aerosol, and the nozzle is operable together with the push button to deliver a discrete dose of aerosol.

2. The combined drop and spray nozzle device according to claim 1, wherein the valve mechanism is axially movable in the nozzle with respect to the delivery outlet to open and close an upper portion of the delivery outlet.

3. The combined drop and spray nozzle device according to claim 1, wherein the push-button is provided on an upper end of the nozzle and is coupled to the valve mechanism for moving the valve mechanism to close an upper portion of the delivery outlet when the push-button is depressed and open the upper portion of the delivery outlet when the push-button is not depressed.

4. The combined drop and spray nozzle device according to claim 3, further comprising:

- a cavity provided in the nozzle in communication with an opening of the delivery outlet and the valve mechanism such that when the nozzle is operated together with the push button to deliver a discrete dose of aerosol, the discrete dose of aerosol corresponds in volume to a volume of the cavity; and
- a set screw for steplessly adjusting the volume of the cavity.

5. The combined drop and spray nozzle device according to claim 4, further comprising a closable cap mounted on the nozzle above the push-button for protecting the push-button from unintentional depression thereof.

6. The combined drop and spray nozzle device according to claim 5, further comprising an adjustable stop for presetting the predetermined portion of the delivery outlet which the valve mechanism opens and closes responsive to the push-button.

7. The combined drop and spray nozzle device according to claim 1, further comprising a cavity provided in the nozzle in communication with an opening of the delivery outlet and the valve mechanism such that when the nozzle is operated together with the push button to deliver a discrete dose of aerosol, the discrete dose of aerosol corresponds in volume to a volume of the cavity.

8. The combined drop and spray nozzle device according to claim 7, wherein the cavity has an adjustable volume.

9. The combined drop and spray nozzle device according to claim 8, further comprising a set screw for steplessly adjusting the volume of the cavity.

10. The combined drop and spray nozzle device according to claim 1, further comprising a closable cap mounted on the nozzle above the push-button for protecting the push-button from unintentional depression thereof.

11. The combined drop and spray nozzle device according to claim 1, further comprising an adjustable stop for presetting the predetermined portion of the delivery outlet which the valve mechanism opens and closes responsive to the push-button.

* * * * *